United States Patent
Park

(10) Patent No.: US 7,424,314 B2
(45) Date of Patent: Sep. 9, 2008

(54) MOBILE PHONE CHARGER WITH STERILIZATION FUNCTION AND METHOD FOR STERILIZING MOBILE PHONE USING THE SAME

(75) Inventor: Gun-Hee Park, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 832 days.

(21) Appl. No.: 10/758,904

(22) Filed: Jan. 16, 2004

(65) Prior Publication Data

US 2004/0147293 A1 Jul. 29, 2004

(30) Foreign Application Priority Data

Jan. 16, 2003 (KR) .................. 10-2003-0002934

(51) Int. Cl.
*H04B 1/38* (2006.01)
*A61L 2/00* (2006.01)

(52) U.S. Cl. ............... 455/573; 455/572; 455/575.1; 379/452

(58) Field of Classification Search ............ 455/573, 455/572, 574, 575.1, 556.1, 556.2; 379/452, 379/439, 451, 437; 422/24, 186.3
See application file for complete search history.

(56) References Cited

U.S. PATENT DOCUMENTS

| | | | |
|---|---|---|---|
| 5,744,933 A * | 4/1998 | Inoue et al. | 320/110 |
| 6,461,568 B1 * | 10/2002 | Eckhardt | 422/24 |
| 6,490,351 B1 * | 12/2002 | Roberts | 379/452 |
| 6,526,293 B1 * | 2/2003 | Matsuo | 455/573 |
| 6,534,953 B2 * | 3/2003 | Shirakawa | 320/114 |

OTHER PUBLICATIONS

Gerhard; Process For Charging Accumulators In Cordless Communications Equipment; May 11, 1994; WO 94/10782.*

* cited by examiner

*Primary Examiner*—Melur Ramakrishnaiah
(74) *Attorney, Agent, or Firm*—The Farrell Law Firm, PC

(57) ABSTRACT

A mobile phone charger with a sterilization function. The mobile phone charger includes a charging current generator and a sterilizer. The charging current generator generates a charging current to charge the battery of the mobile phone upon receiving an input current, and selectively generates the charging current upon receiving a charging initiation signal. The sterilizer is driven by the charging current received from the charging current generator, and sterilizes the battery and the mobile phone at predetermined time intervals. Therefore, the mobile phone charger prevents the propagation of microbes and germs adhered to the mobile phone, and prevents the surface of the mobile phone from being discolored.

29 Claims, 7 Drawing Sheets

MOBILE PHONE CHARGER WITH STERILIZATION FUNCTION AND METHOD FOR STERILIZING MOBILE PHONE USING THE SAME

PRIORITY

This application claims priority to an application entitled "MOBILE PHONE CHARGER WITH STERILIZATION FUNCTION AND METHOD FOR STERILIZING MOBILE PHONE USING THE SAME", filed in the Korean Intellectual Property Office on Jan. 16, 2003 and assigned Serial No. 2003-02934, the contents of which are hereby incorporated by reference.

BACKGROUND OF THE INVENTION

1. Field of the Invention

The present invention relates to a mobile phone charger, and more particularly to a mobile phone charger for charging a mobile phone with a prescribed voltage, and for executing additional service functions.

2. Description of the Related Art

With the increasing development of the information and communications industries, a variety of mobile phones for enabling more than two users to communicate with each other anywhere they wish have rapidly come into widespread use in recent years. Typically, such a mobile phone is designed to execute necessary operations in response to a user's input signal after being powered on by electric power charged in its own battery, which is detachably connected to its own main body. When the battery is depleted, the battery is recharged by a mobile phone charger for charging such a battery with electricity.

FIG. 1 is a perspective view illustrating a conventional mobile phone charger, which includes a main body 1, a mobile phone coupling groove 3, a battery coupling groove 5, a pair of charging connectors 7, and a plug 9 attached to the charger by a wire 8. The main body 1 encloses and insulates a transformer (not shown) for converting an input current into a prescribed voltage. The mobile phone coupling groove 3 allows a mobile phone to be detachably connected to the main body 1 in a vertical direction, and the mobile phone is slid therethrough. The battery coupling groove 5 is formed in the rear of the mobile phone coupling groove 3 to allow only a battery to be detachably connected to the main body 1. The charging connectors 7 are located at a lower part of the battery coupling groove 5 to transmit a current corresponding to a voltage received from the transformer to the battery being mounted to either the mobile phone in coupling groove 3 or the battery coupling groove 5. The plug 9 is selectively connected to a wall outlet by a user, and allows the transformer to receive external power through the main body 1 and wire 8. Therefore, the mobile phone charger converts electric power from the plug 9 into a prescribed voltage value, and charges the battery with a current corresponding to the prescribed voltage value.

When a user makes a phone call to another party using his or her mobile phone, the mobile phone's surface touched by the user and the mobile phone's transmitter having a microphone to pick up his or her voice signal may be contaminated by saliva or sweat. Many users may share the use of only one mobile phone in some cases, where several users in one location use the same phone to communicate with counterparts in remote locations.

In this way, if the one mobile phone used by many users is contaminated by saliva or sweat of the users while being used, a variety of pathogenic microbes and germs may adhere to any surface of the mobile phone and be passed from one user to another. In this case, as each new user holds the mobile phone, the pathogenic microbes may be propagated to other articles via the user's hand, thus causing health concerns.

The sweat or saliva present on the surface of the mobile phone may infiltrate into the inside of the mobile phone, and the microbes and germs bred on the surface of the mobile phone may be propagated to the inside of the mobile phone, particularly on or near the microphone. To prevent transmission of the germs and to sterilize the phone, the user must therefore disassemble and clean the inside of his or her mobile phone to remove any microbes or germs from his or her mobile phone, resulting in greater inconvenience for the user.

SUMMARY OF THE INVENTION

Therefore, it is an object of the present invention to provide a mobile phone charger for suppressing the propagation of microbes and germs adhered to a mobile phone or to sterilize the phone, and a method for sterilizing a mobile phone using the same.

It is another object of the present invention to provide a mobile phone charger for sterilizing a mobile phone during a mobile phone charging time, and a method for sterilizing a mobile phone using the same.

It is yet another object of the present invention to provide a mobile phone sterilization method which provides a mobile phone with a given idle time or interval such as a charging period to sterilize the phone to thereby prevent the mobile phone from being overexposed to any sterilizer.

In accordance with one aspect of the present invention, the above and other objects can be accomplished by the provision of a mobile phone charger for charging a battery of a mobile phone with a prescribed voltage, including: a charging current generator for generating a charging current to charge the battery of the mobile phone upon receiving an input current, and selectively generating the charging current; and a sterilizer for detecting the charging current, and sterilizing the mobile phone mounted to a connector using the detected charging current.

Preferably, the sterilizer may sterilize the mobile phone and its battery while the mobile phone and the battery are charged with the charging current.

Preferably, the mobile phone may further include a charging controller. The charging controller may control the charging current generator to check a voltage charged in the battery, to generate the charging current when the checked voltage is lower than a predetermined reference voltage, and to interrupt the output of the charging current when the checked voltage is higher than the predetermined reference voltage. In this case, the battery may be charged with a prescribed voltage at predetermined time intervals, thereby preventing overheating of the battery. Therefore, if the charging current is applied to the mobile phone and the battery, the sterilizer may execute a sterilization function at the start of the prescribed charging period of time. In case of interrupting the output of the charging current, the sterilizer may terminate the sterilization function.

Preferably, the sterilizer repeatedly executes the sterilization function at predetermined time intervals, and generates different wavelengths of a predetermined range to sterilize the mobile phone and the battery. Preferably, the sterilizer selectively generates different wavelengths from among wavelengths of a predetermined range at predetermined time intervals. The sterilizer may be either an infrared sterilizer or an ultraviolet sterilizer.

In accordance with another aspect of the present invention, there is provided a method for sterilizing a mobile phone using a mobile phone charger, including the steps of: a) generating a charging current to charge a battery of the mobile phone upon receiving an input current; b) determining whether the mobile phone is mounted to a charging connector transferring the charging current to the mobile phone; and c) if the mobile phone is mounted to the charging connector, sterilizing the mobile phone.

Preferably, step (c) includes the steps of: c1) checking a voltage value charged in the battery of the mobile phone mounted to the charging connector; c2) comparing the checked voltage value with a predetermined voltage value; c3) if the checked voltage value is lower than the predetermined voltage value, transmitting the charging current to the mobile phone mounted to the charging connector; and c4) charging the battery with the charging current, and sterilizing the mobile phone.

Preferably, step (c) further includes the steps of: c5) if the checked voltage value is higher than the predetermined voltage value, terminating the charging current applied to the mobile phone; and c6) if the charging current is terminated, terminating charging the battery of the mobile phone and at the same time terminating a sterilization function for sterilizing the mobile phone.

Preferably, the sterilization function is repeatedly executed at predetermined time intervals, and is executed by generating different wavelengths within a predetermined range to sterilize the mobile phone and the battery. Therefore, different wavelengths from among wavelengths of a predetermined range are selectively generated at the predetermined time intervals during a sterilization time.

Preferably, the sterilization function uses either an infrared sterilization process or an ultraviolet sterilization process.

In accordance with yet another aspect of the present invention, there is provided a mobile phone charger for charging a battery of a mobile phone with a prescribed voltage, including: a charging current generator for selectively generating a charging current to charge the battery of the mobile phone upon receiving an input current; a charging connector detachably connected to the mobile phone, receiving charging status information indicative of a charging function active/inactive state of the mobile phone, and outputting the charging current generated from the charging current generator to the mobile phone; and a sterilizer for sterilizing the mobile phone connected to the charging connector using the charging current after the mobile phone is connected to the charging connector.

Preferably, the sterilizer may execute a sterilization function of the mobile phone if it is determined that the battery of the mobile phone is charged with the charging current on the basis of the charging status information. Preferably, the sterilizer may repeatedly execute and terminate the sterilization function at predetermined time intervals. Preferably, the sterilizer may execute the sterilization function by generating different wavelengths within a predetermined range.

Preferably, the sterilizer may selectively generate different wavelengths from among wavelengths within the predetermined range at the predetermined time intervals. The sterilizer may be either an infrared sterilizer or an ultraviolet sterilizer.

In accordance with yet another aspect of the present invention, there is provided a method for sterilizing a mobile phone using a mobile phone charger with a sterilization function for sterilizing the mobile phone and a battery of the mobile phone, including the steps of: a) providing the mobile phone with a charging current; b) determining whether the mobile phone receives charging status information indicative of a charging operation active/inactive state of the battery; c) if the mobile phone receives the charging status information, determining whether a voltage value contained in the charging status information remains at a logic high state or a logic low state; and d) if the voltage value remains at a logic high state, executing a sterilization function of the mobile phone.

Preferably, the method further includes the step of: e) if the voltage value remains at a logic low state, terminating the sterilization function of the mobile phone. Preferably, the sterilization function may be repeatedly executed at predetermined time intervals. Preferably, the sterilization function may be executed by generating different wavelengths from among wavelengths within a predetermined range. More preferably, the sterilization function may generate different wavelengths from among wavelengths within the predetermined range at the predetermined time intervals.

Preferably, a mobile phone is sterilized while its own battery is charged with a voltage, resulting in a simplified sterilization process of the mobile phone. A mobile phone charger with a sterilization function prevents the propagation of microbes and germs adhered to the mobile phone, resulting in cleanliness of the mobile phone. Therefore, the mobile phone is sterilized and at the same time its battery is charged with a prescribed voltage, such that there is no need for a user to spend additional time to sterilize the mobile phone. Further, the mobile phone is sterilized at predetermined time intervals, and different wavelengths within a predetermined range are periodically generated to execute such a sterilization process, resulting in the prevention of surface discoloration of the mobile phone.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
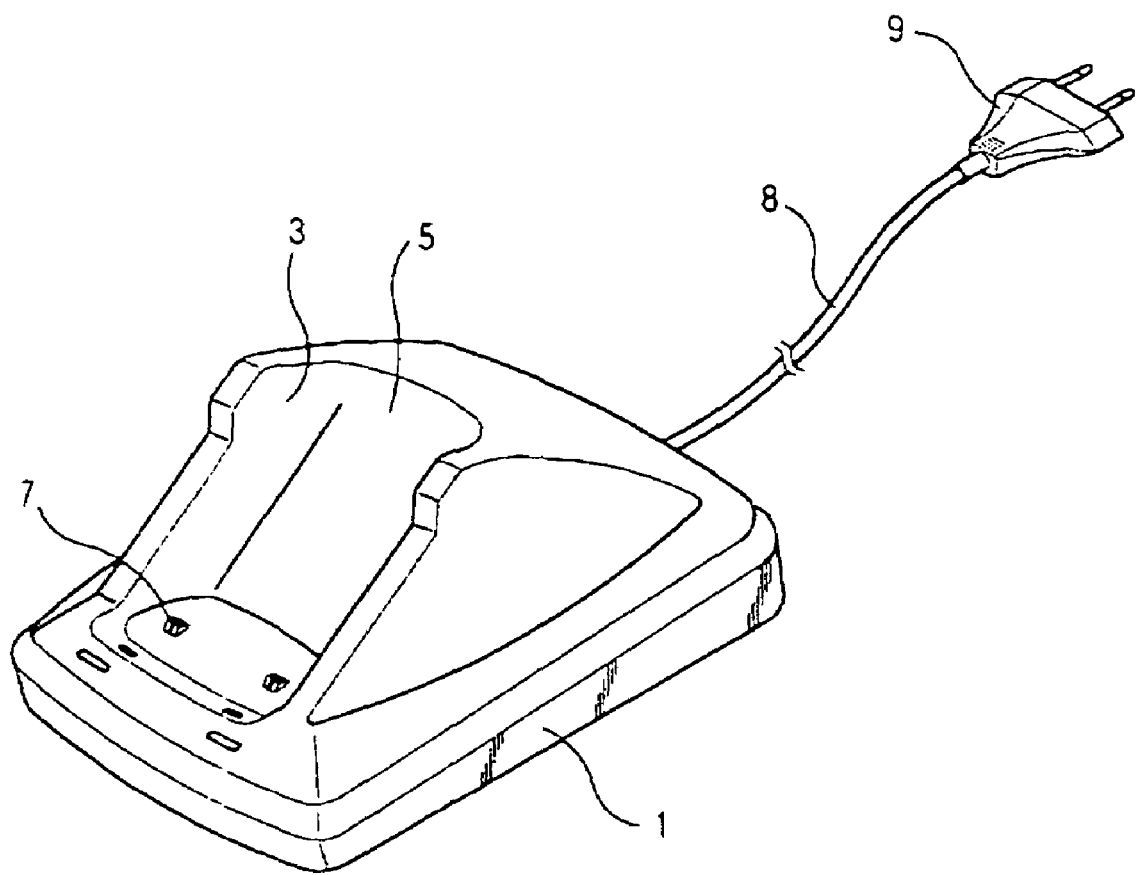
FIG. 1 is a perspective view illustrating a conventional mobile phone charger.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

Figure 2:
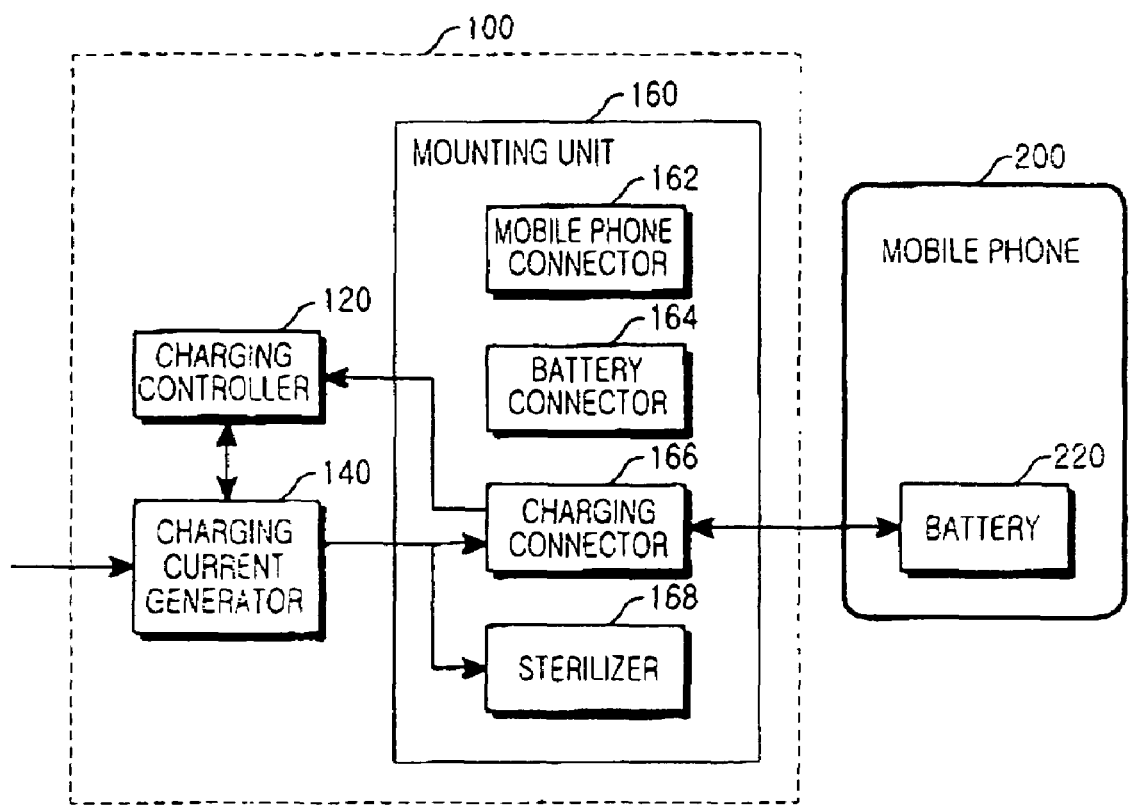
FIG. 2 is a block diagram of a mobile phone charger with a sterilization function in accordance with a preferred embodiment of the present invention.

FIG. 2 is a block diagram of a mobile phone charger with a sterilization function in accordance with a preferred embodiment of the present invention. As shown in FIG. 2, the mobile phone charger 100 includes a charging current generator 140, a mounting unit 160, and a charging controller 120.

The charging current generator 140 generates a charging current to charge a battery 220 upon receiving an electric current from an external device. The mounting unit 160 is connected to a mobile phone 200 to be charged with a charging current generated from the charging current generator 140, and receives a charging current from the charging current generator 140. The charging controller 120 controls a voltage transformation operation of the charging current generator 140 and the output of the charging current, and receives data from the mobile phone 200 mounted to the mounting unit 160.

The mounting unit 160 includes a mobile phone connector 162, a battery connector 164, a charging connector 166, and a sterilizer 168. The mobile phone 200 is connected to the mobile phone connector 162 via a coupling groove (not shown) through which the mobile phone 200 is charged with a charging current. The battery 220 of the mobile phone 200 is connected to the battery connector 164 via a coupling groove (not shown) to charge the battery 220 with a voltage. The charging connector 166 outputs a charging current to the mobile phone 200 connected to the mobile phone connector 162 and the battery 220 connected to the battery connector 164, respectively. That is, the charging current can be provided to the battery connected to the phone and/or a battery provided separately with the phone. If the mobile phone 200 and the battery 220 are respectively connected to the mobile phone connector 162 and the battery connector 164, the sterilizer 168 sterilizes the mobile phone 200 and/or the battery 220 upon receiving the current from the charging current generator 140.

If the battery 220 is connected to the charging connector 166, any voltage charged in the battery 220 is applied to the charging controller 120 via the charging connector 166. In this case, the charging controller 120 checks a voltage value charged in the battery 220 on the basis of an output voltage value received from the charging connector 166. If the checked voltage value charged in the battery 220 is lower than a prescribed voltage value, the charging controller 120 controls a current output operation of the charging current generator 140 to output a charging current to the charging connector 166 and the sterilizer 168. Therefore, an output current of the charging current generator 140 is applied to the battery 220 via the charging connector 166 such that the battery 220 is charged with a voltage and then the sterilizer 168 executes a sterilization function. Upon receiving a current from the charging current generator 140, the sterilizer 168 sterilizes the mobile phone 200 connected to the mobile phone connector 162 and the battery 220 connected to the battery connector 164, respectively.

The charging controller 120 detects a voltage value charged in the battery 220 while the battery 220 is charged with the voltage over the charging connector 166. If the battery 220 is charged with the voltage higher than a prescribed voltage, the charging controller 120 controls the charging current generator 140 to cut off a current corresponding to a voltage being applied to the charging connector 166 and the sterilizer 168. Therefore, the charging current generator 140 stops charging the battery 220 connector, and the sterilizer 168 stops the sterilization process.

The sterilizer 168 repeatedly sterilizes the mobile phone 200 and the battery 220 at predetermined time intervals. A timer (not shown) needed to periodically execute a sterilization function may be connected to any one of the sterilizer 168, the mounting unit 160, the mobile phone charger 100, and the mobile phone 200. The sterilizer 168 repeatedly executes or interrupts such a sterilization function at the predetermined time intervals according to a prescribed time value received from the timer.

In the meantime, if a voltage value (or level) of the battery 220 is below the prescribed voltage value (or level), the charging controller 120 controls the charging current generator 140 to output a charging current. Therefore, the battery 220 is charged with a voltage using the charging current received from the charging connector 166. The sterilizer 168 sterilizes the mobile phone 200 and the battery 220 while the battery 220 is charged with the voltage. The sterilizer 168 repeatedly executes or interrupts its sterilization function at the predetermined time intervals.

The above charging process for providing the battery 220 with the charging current according to a control signal from the charging controller 120 is divided into a pre-charge mode, a constant current mode, and a constant voltage mode, so their detailed description will hereinafter be given in detail.

The pre-charge mode is a prescribed charge mode for preventing malfunction caused by power dissipation of the battery 220 under the condition that the battery 220 is charged with a voltage less than a reference voltage. Preferably, the reference voltage is 2.8 V. A small amount of current is applied to the battery 220 for a few minutes in the pre-charge mode.

The constant current mode is also called a fast charge mode, and is a prescribed charge mode for providing the battery 220 with a prescribed peak current. The peak current is preferably in the range of 550 to 600 mA. If the battery 220 is charged with a voltage corresponding to a prescribed threshold voltage in the constant current mode, then the constant current mode is switched to the constant voltage mode. The prescribed threshold voltage is preferably 4.2 V. A rapid charging operation may occur in the constant current mode for a predetermined time, preferably between 30 and 50 minutes.

The constant voltage mode is a prescribed charge mode for providing the battery 220 with a charging current to maintain a constant voltage in the battery 220, such that it prevents the lifetime or performance of the battery 220 from being degraded while the battery 220 is charged with a voltage higher than the threshold voltage. The charging controller 120 executes a charging operation of the battery 220 and at the same time lowers the output level of a charging current to prevent the voltage charged in the battery 220 from exceeding the threshold voltage. In other words, the charging controller 120 provides the battery 220 with a charging current to maintain a voltage of 4.2 V in the battery 220. If a voltage charged in the battery 220 is higher than the voltage of 4.2 V, then the charging controller 120 stops providing the battery 220 with the charging current. The constant voltage mode may be executed for almost one hour.

The sterilizer 168 may execute a sterilization function for a current charging period of the battery 220 or a prescribed period of time, but may execute or stop the sterilization function according to the above charge modes. The sterilizer 168 is able to execute the sterilization function for a predetermined time whenever any charge mode is changed to another mode. The sterilizer 168 may execute the sterilization function in the constant current mode, and may execute it in the constant voltage mode, such that it prevents the surface of the mobile phone 200 from being discolored.

The sterilizer 168 generates wavelengths of a predetermined wavelength band to sterilize the mobile phone 200 and the battery 220. Preferably, when executing a sterilization function, the sterilizer 168 generates different wavelengths from among the wavelengths at predetermined time intervals. An infrared sterilizer or an ultraviolet sterilizer is preferably utilized as the sterilizer 168.

Typically, many users charge their mobile phones with a prescribed voltage more than once a day, however, only the charging function occur. In accordance with the present invention, the mobile phone 200 is also sterilized during a voltage charge time of the battery 220, resulting in cleanliness of the mobile phone 200.

In order to minimize the number of harmful effects, for example, overheating of the mobile phone 200 caused by a continuous charging operation, and surface discoloration of the mobile phone 200 caused by a continuous sterilization operation, etc., the sterilizer 168 executes a sterilization function during a charging period of the mobile phone 200, resulting in a user's convenience in charging the battery 220, as well as cleanliness of the mobile phone 200.

The mobile phone 200 is sterilized at predetermined time intervals and different wavelengths within a predetermined range are periodically generated to provide additional sterilization, resulting in the prevention of surface discoloration of the mobile phone 200.

Figure 3:
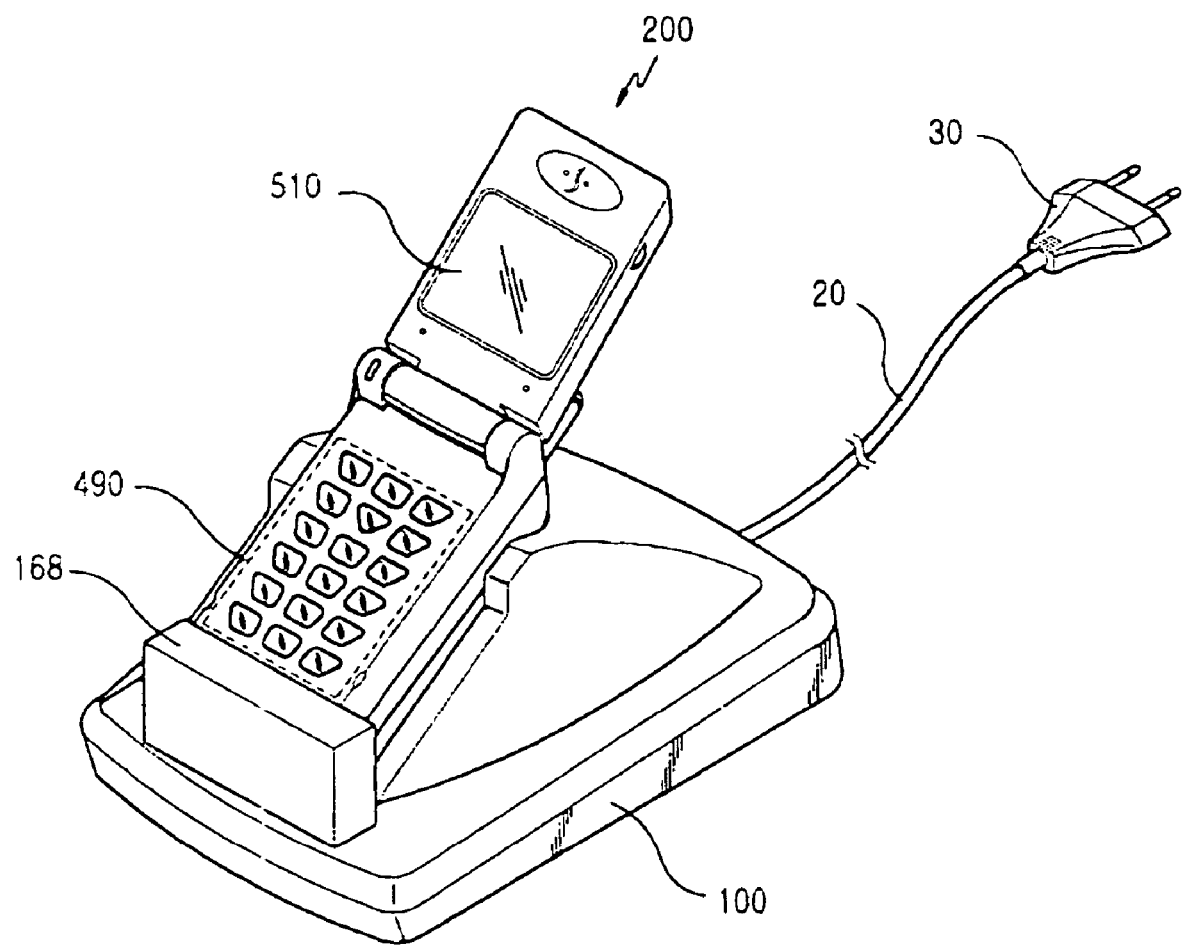
FIG. 3 is a perspective view illustrating the appearance of a mobile phone charger of FIG. 2 coupled with a mobile phone in accordance with a preferred embodiment of the present invention.

FIG. 3 is a perspective view illustrating the appearance of a mobile phone charger of FIG. 2 coupled with a mobile phone in accordance with a preferred embodiment of the present invention. Referring to FIG. 3, the mobile phone 200 is detachably connected to the mobile phone charger 100 through the mobile phone connector 162. The battery 220 of the mobile phone 200 is connected to the charging connector 166, and applies the value of a voltage charged in the battery 220 to the charging controller 120 through the charging connector 166. The charging controller 120 checks a voltage level on the basis of the voltage value received via the charging connector 166. If it is determined that the checked voltage value of the battery 220 is lower than a prescribed voltage value, the charging controller 120 controls the charging current generator 140 transforming an input current received from an external outlet over a wire 20 into a voltage of a predetermined level, and thus allows the charging current generator 140 to generate a charging current corresponding to a transformed voltage. Therefore, the battery 220 is charged with the charging current transmitted via the charging connector 166, and the sterilizer 168 sterilizes the mobile phone 200 connected to the mobile phone connector 162 using an output current of the charging current generator 140.

Figure 4:
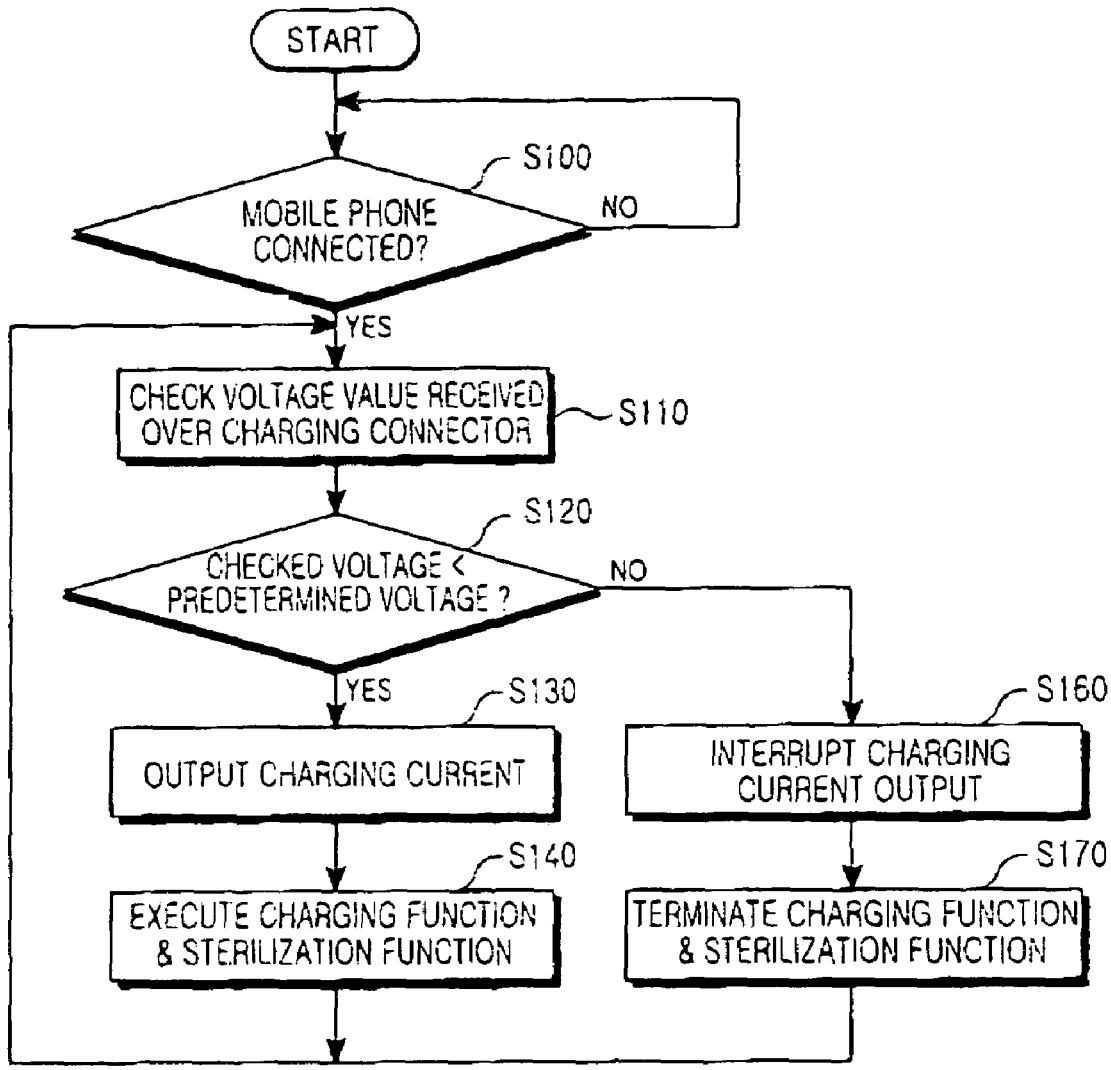
FIG. 4 is a flow chart illustrating a procedure for sterilizing a mobile phone in accordance with a preferred embodiment of the present invention.

FIG. 4 is a flow chart illustrating a procedure for sterilizing a mobile phone in accordance with a preferred embodiment of the present invention, and particularly depicts a method for sterilizing a mobile phone based on FIGS. 2~3. Referring to FIGS. 2 to 4, the charging controller 120 determines at step S100 whether the mobile phone 200 is mounted to the mobile phone connector 162 to connect the battery 220 with the charging connector 166. If it is determined at step S100 that the mobile phone 200 is mounted to the mobile phone connector 162, the charging controller 120 receives a voltage of the battery 220 from a charging connector 166, and checks the received voltage value of the battery 220 at step S110.

The charging controller 120 compares the checked voltage value with a prescribed voltage value at step S120. If it is determined at step S120 that the checked voltage value is less than the prescribed voltage value, the charging controller 120 controls the charging current generator 140 to output a charging current at step S130. Therefore, the battery 220 is charged with a predetermined voltage according to the charging current generated from the charging current generator 140 at step S140. The sterilizer 168 sterilizes the mobile phone 200 using the output current of the charging current generator 140 at step S140. During these charging and sterilization functions, the charging controller 120 returns to step S110 and repeats steps S110 through S140.

Preferably, the sterilizer 168 repeatedly executes such a sterilization function for sterilizing the mobile phone 200 and the battery 220 during a predetermined period of time at step S140. The sterilizer 168 generates wavelengths within a predetermined range to sterilize the mobile phone 200 and the battery 220. During sterilization of the mobile phone 200 and the battery 220, it is preferable for the sterilizer 168 to generate different wavelengths from among the wavelengths of the predetermined range at predetermined time intervals. An infrared sterilizer or an ultraviolet sterilizer is adapted as the sterilizer 168.

In the meantime, if it is determined at step S120 that the checked voltage value is greater than the prescribed voltage value, the charging controller 120 controls the charging current generator 140 to interrupt the output of a charging current at step S160. If the output of charging current is interrupted, the battery 220 stops charging and the sterilizer 168 stops its sterilization at step S170. In case of executing such a sterilization function at step S170, it is preferable for the sterilizer 168 to repeatedly sterilize the mobile phone 200 and the battery 220 at intervals of a predetermined time. It is also preferable for the sterilizer 168 to generate different wavelengths from among many wavelengths of the predetermined range in such a way that it sterilizes the mobile phone 200 and the battery 220.

Therefore, the sterilizer 168 sterilizes the mobile phone 200 while the battery 220 of the mobile phone 200 is charged with a prescribed voltage, resulting in a simplified sterilization process of the mobile phone 200. Further, the mobile phone 200 is sterilized at predetermined time intervals, and different wavelengths within a predetermined range are periodically generated to provide additional sterilization, resulting in the prevention of surface discoloration of the mobile phone 200.

Figure 5:
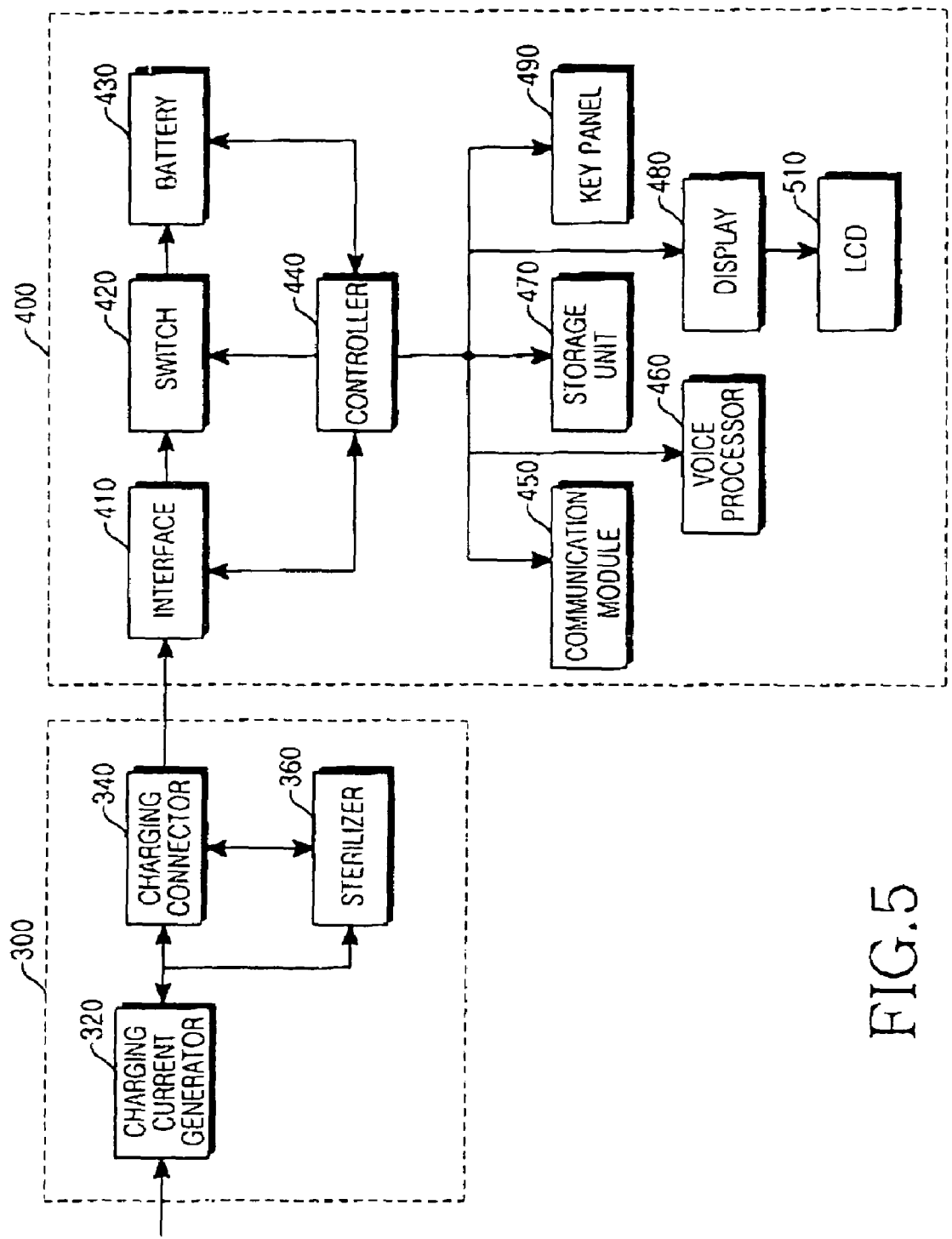
FIG. 5 is a block diagram of a mobile phone charger with a sterilization function in accordance with another preferred embodiment of the present invention.

FIG. 5 is a block diagram of a mobile phone charger with a sterilization function in accordance with another preferred embodiment of the present invention. Referring to FIG. 5, the mobile phone charger 300 includes a charging current generator 320, a charging connector 340, and a sterilizer 360.

The charging current generator 320 transforms an external current into a voltage of a predetermined level, and generates a charging current to charge the battery 430. The charging connector 340 is connected to a mobile phone 400 for receiving the charging current generated from the charging current generator 320, and thus outputs the charging current to the mobile phone 400. Therefore, a battery 430 of the mobile phone 400 is charged with a predetermined voltage corresponding to the charging current received over the charging connector 340.

While the battery 430 is charged with the predetermined voltage corresponding to the charging current over the charging connector 340, the sterilizer 360 sterilizes the mobile phone 400 with a predetermined sterilization method in such a way that it removes the microbes and germs from the mobile phone 400 connected to the charging connector 340 or suppresses the propagation of the microbes and germs. An ultraviolet sterilizer and/or an ozone sterilizer are/is adapted as the sterilizer 360 in this preferred embodiment of the present invention.

Therefore, the sterilizer 360 sterilizes the mobile phone 400 while the battery 430 of the mobile phone 400 is charged with a predetermined voltage, resulting in a simplified sterilization process of the mobile phone 400.

The sterilizer 360 sterilizes the mobile phone 400 while the battery 430 of the mobile phone 400 connected to the charging connector 340 is charged with the predetermined voltage. If a voltage charged in the battery 430 is higher than a predetermined reference voltage during such a voltage charge time of the battery 430, the sterilizer 360 stops sterilizing the mobile phone 400. In addition, if the voltage value of the battery 430 is lower than the reference voltage and battery 430 requires an extended charging time, it is preferable for the mobile phone 400 to execute a voltage charge function using the charging connector 340 and is also preferable for the sterilizer 360 to re-execute a sterilization function.

Therefore, the above process for charging the battery 430 with a voltage is executed or terminated on the basis of a voltage charge state of the battery 430, resulting in the prevention of surface discoloration of the mobile phone 400.

The mobile phone 400 includes an interface 410, a switch 420, the battery 430, and a controller 440. The controller 440 may be a charging IC (Integrated Circuit) or a PMU (Power Management Unit), etc., for executing a charging control function.

The interface 410 includes a plurality of pins for data transmission, and may be connected to an external device to receive data from the external device. The interface 410 is detachably connected to the charging connector 340, and receives a charging current from the charging connector 340. The interface 410 receives data transmitted between the mobile phone charger 300 and the mobile phone 400.

The switch 420 selectively outputs a charging current received at the interface 410 to the battery 430 according to an input signal. If the switch 420 is turned on, then the battery 430 is charged with a predetermined voltage corresponding to the charging current received at the interface 410. The controller 440 determines whether or not the interface 410 receives the charging current, and checks a voltage value charged in the battery 430. In this case, if the checked voltage value of the battery 430 is lower than a full-charge voltage value of the battery 430, the controller 440 turns on the switch 420 and thereby the battery 430 is charged with a predetermined voltage corresponding to the charging current received at the interface 410. Otherwise, if the controller 440 determines that the battery 430 is fully charged with such a full-charge voltage by repeatedly checking a voltage value of the battery 430 during a voltage charge time of the battery 430, it turns off the switch 420 to prevent the battery 430 from overheating due to a repeated charging operation.

The controller 440 transmits charging status information indicative of a voltage charge status of the battery 430 to the mobile phone charger 300 over the interface 410. The charging connector 340 of the mobile phone charger 300 transmits the received charging status information to the sterilizer 360. The sterilizer 360 selectively executes a sterilization function of the mobile phone 400 according to charging status information received from the charging connector 340. Preferably, if the charging status information is indicative of a voltage charge state of the battery 430, the sterilizer 360 executes the sterilization function of the mobile phone 400. Alternatively, if the charging status information is indicative of a full-charge voltage of the battery 430, the sterilizer 360 stops sterilizing the mobile phone 400.

Preferably, the sterilizer 360 repeatedly executes the sterilization function of the mobile phone 400 at a predetermined time intervals. The sterilizer 360 may periodically generate different wavelengths from among many wavelengths within a predetermined range in such a way that it sterilizes the mobile phone 400.

In the meantime, the controller 440 transmits the charging status information indicative of a current charge status to the mobile phone charger 300. During a voltage charge time of the battery 430, the controller 440 transmits a high-level signal indicative of charging status information of a voltage lower than a predetermined threshold voltage to the mobile phone charger 300. If the voltage charge time of the battery 430 elapses, then the controller 440 transmits a low-level signal indicative of charging status information of a voltage higher than the predetermined threshold voltage. Briefly, the sterilizer 360 executes a sterilization function under the condition that received charging status information corresponds to a high-level signal, and terminates the sterilization function under the condition that received charging status information corresponds to a low-level signal.

The sterilizer 360 compares a voltage value contained in the charging status information with a predetermined threshold voltage value. If the voltage value contained in the charging status information is lower than the predetermined threshold voltage value, the sterilizer 360 determines that the charging status information is a logic high signal. If the voltage value contained in the charging status information is higher than the predetermined threshold voltage value, the sterilizer 360 determines that the charging status information is a logic low signal. In this case, the high level signal indicates a charging state of the battery 430, and the low level signal indicates a charging completion state of the battery 430.

Preferably, a sterilization time for which the mobile phone 400 is sterilized by the sterilizer 360 may be set to be adjustable in response to the degree of potential damage of the mobile phone 400 affected by the material for use, i.e., the materials used for ultraviolet sterilization and ozone sterilization in sterilizing a mobile phone, in either an ultraviolet sterilization method or an ozone sterilization method adapted as a sterilization method of the present invention. While the controller 440 remains at a standby mode after the battery 430 completes its own charging, the controller 440 controls the battery 430 to be re-charged with any voltage whenever a voltage value of the battery 430 drops to less than a predetermined voltage value. In this case, the sterilizer 360 re-executes the sterilization function of the mobile phone 400 as described above. If the battery 430 is fully charged with voltage, the controller 440 turns off the switch 420 to stop charging the battery 430, and the sterilizer stops sterilizing the mobile phone 400.

The mobile phone 400 further includes a communication module 450, a voice processor 460, a storage unit 470, a display 480, and a key panel 490. The communication module 450 is connected to an antenna to establish communications with an external communication device over a prescribed frequency band. The voice processor 460 outputs a voice signal received from the controller 440 to a speaker (not shown), or outputs an acoustic signal captured by a microphone (not shown) to the controller 440. The storage unit 470 temporarily stores a driving program for controlling the controller 440 and data created by a control operation of the controller 440. The display 480 displays displayable data on an LCD (Liquid Crystal Display) 510 according to a control signal from the controller 440. The key panel 490 includes a plurality of number keys, a plurality of character keys, and a plurality of function keys adapted to either select a prescribed function or change any prescribed information to another.

Figure 6:
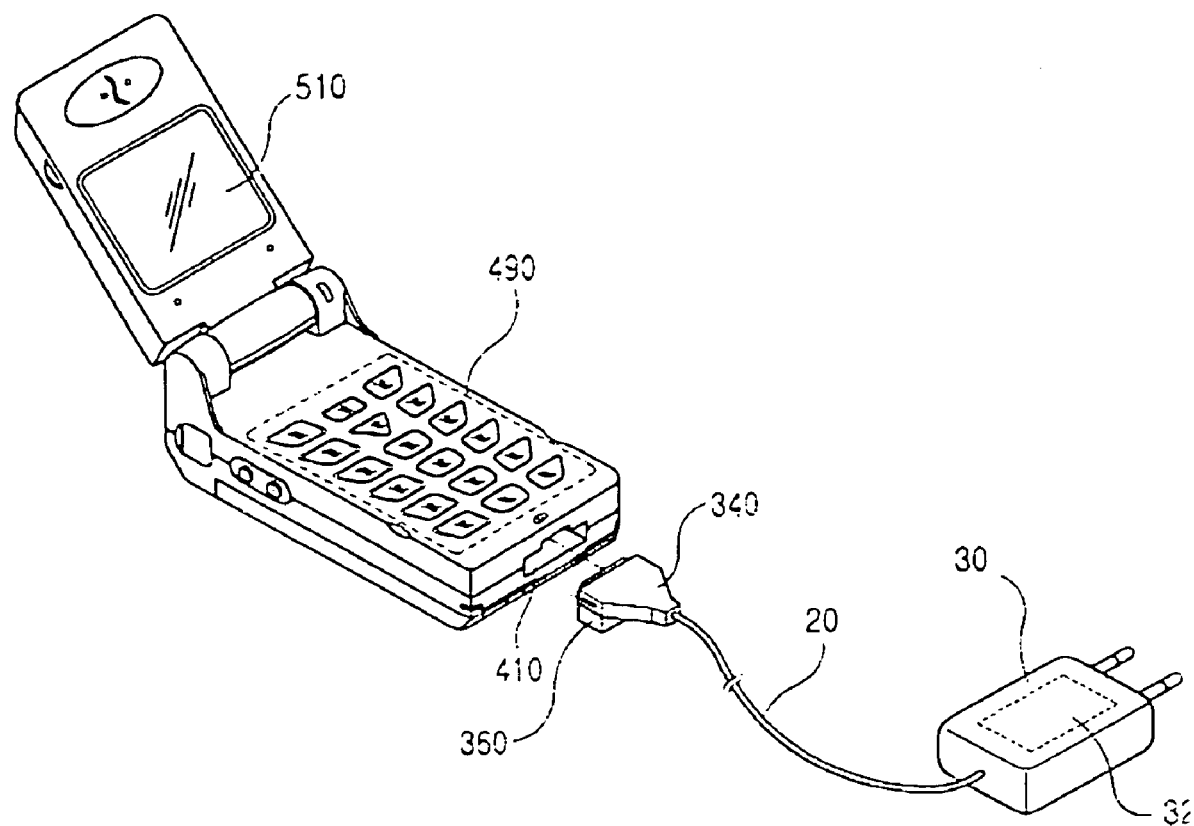
FIG. 6 is a perspective view illustrating the appearance of a mobile phone charger of FIG. 5 coupled with a mobile phone in accordance with another preferred embodiment of the present invention.

FIG. 6 is a perspective view illustrating the appearance of a mobile phone charger of FIG. 5 coupled with a mobile phone in accordance with another preferred embodiment of the present invention. Referring to FIGS. 5~6, the charging connector 340 incorporated with the sterilizer 360 in one body is detachably connected to the interface 410 of the mobile phone 400. The output current of the charging current generator 320 contained in a main body 30 of the mobile phone charger 300 is applied to the charging connector 340 and the sterilizer 360 over a wire 20, and the charging connector 340 sends the charging current generated from the charging current generator 320 to the mobile phone 400. In the case where the battery 430 is charged with a voltage under the condition that a voltage value charged in the battery 430 is lower than a predetermined voltage value, the sterilizer 360 sterilizes the mobile phone 400 using a voltage signal received via the wire 20. Preferably, the sterilizer 360 sterilizes the mobile phone 400 at predetermined time intervals. More preferably, the sterilizer 360 periodically generates different wavelengths from among many wavelengths within a predetermined range to sterilize the mobile phone 400.

Therefore, the mobile phone 400 is sterilized by the sterilizer 360 and at the same time its battery 430 is charged with a prescribed voltage, such that there is no need for a user to spend additional time to sterilize the mobile phone 400. The mobile phone charger 300 periodically sterilizes the mobile phone 400 using its own sterilizer 360, and because it prevents the mobile phone 400 from being overexposed to infrared or ultraviolet rays for a long time, it also prevents the mobile phone 400 from being discolored.

Figure 7:
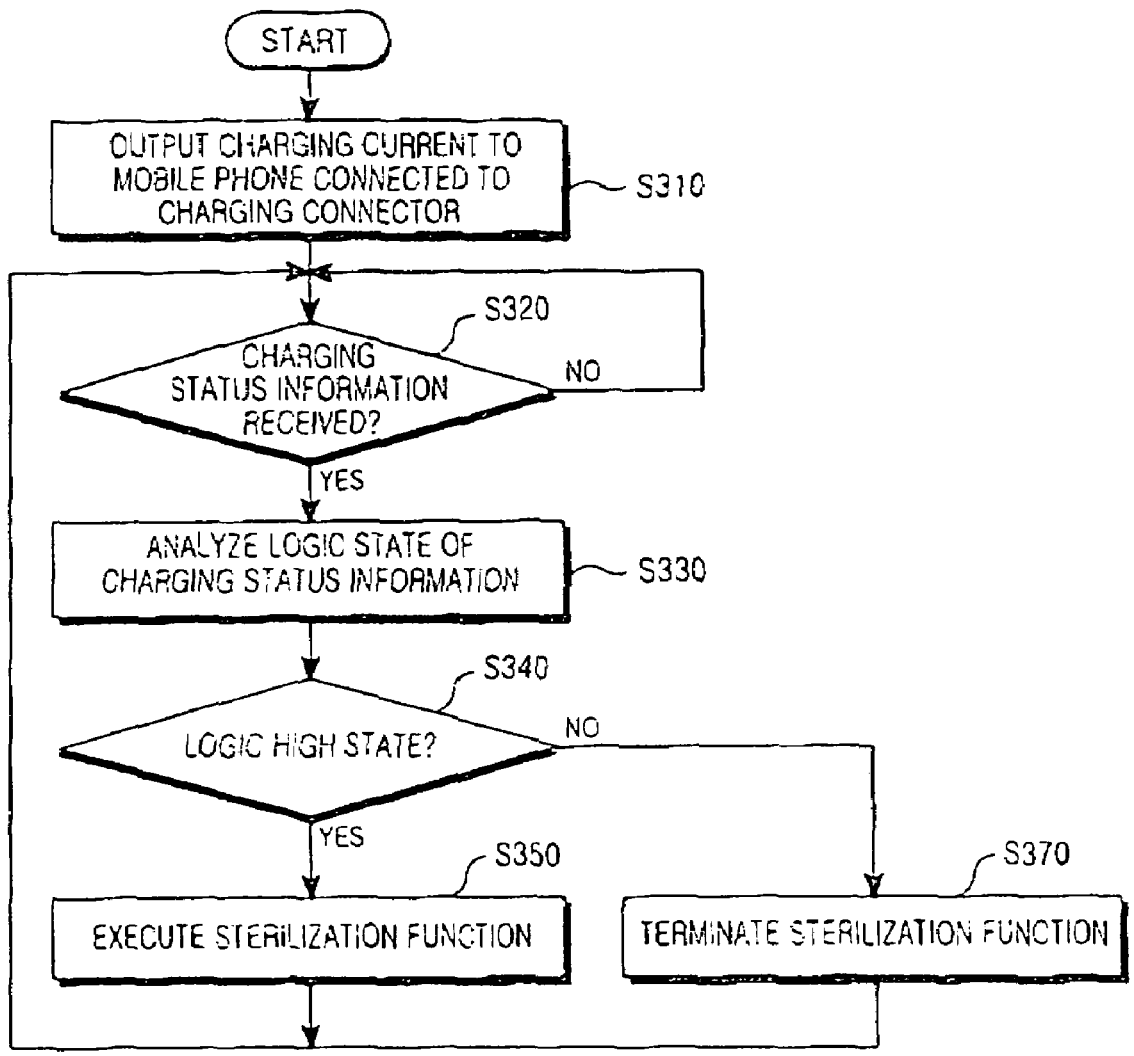
FIG. 7 is a flow chart illustrating a procedure for sterilizing a mobile phone in accordance with another preferred embodiment of the present invention.

FIG. 7 is a flow chart illustrating a procedure for sterilizing a mobile phone in accordance with another preferred embodiment of the present invention, and particularly depicts a method for sterilizing a mobile phone based on FIGS. 5~6. Referring to FIGS. 5 to 7, the charging current generator 320 transforms a voltage received from an external device into a current of a predetermined level, generates a charging current for charging the battery 430, and outputs the charging current to the mobile phone 400 connected to the charging connector 340 at step S310. It is determined at step S320 whether the controller 440 of the mobile phone 400 transmits charging status information of the battery 430 to the sterilizer 360.

If it is determined at step S320 that the controller 440 transmits the charging status information to the sterilizer 360, the sterilizer 360 analyzes a logic level of the charging status information at step S330. The sterilizer 360 determines at step S340 whether a logic level of the analyzed charging status information remains at a logic high state. If it is determined at step S340 that a logic level of the analyzed charging status information remains at a logic high state, the sterilizer 360 executes a sterilization function of the mobile phone 400 connected to the charging connector 340 at step S350. During a sterilization time of the mobile phone 400, the sterilizer 360 returns to step S320 and repeats steps S320 through S350.

On the other hand, if it is determined at step S340 that a logic level of the charging status information remains at a logic low state, the sterilizer 360 stops sterilizing the mobile phone 400 at step S370. Although the sterilizer 360 stops sterilizing the mobile phone 400 at step S370, it may continue to check the charging status information of the battery 430, and may execute necessary operations on the basis of the checked result.

Preferably, during the sterilization function, the sterilizer 360 operates based on a predetermined sterilization time and a predetermined idle time, such that the mobile phone 400 is sterilized for the predetermined sterilization time, and the sterilizer 360 enters an idle mode for the predetermined idle time. That is, the mobile phone 400 is sterilized at predetermined time intervals. The sterilizer 360 may periodically sterilize the mobile phone 400 for a predetermined time upon receiving an input current, irrespective of a voltage charge status of the battery 430 of the mobile phone 400.

Preferably, the sterilizer 360 selectively generates different wavelengths within a prescribed wavelength band to execute the sterilization function, and selectively applies these wavelengths at predetermined time intervals to sterilize the mobile phone 400.

As apparent from the above description, a mobile phone is sterilized while its own battery is charged with a voltage, resulting in a simplified sterilization process of the mobile phone. A mobile phone charger with a sterilization function prevents the propagation of microbes and germs adhered to the mobile phone, resulting in cleanliness of the mobile phone. Therefore, the mobile phone is sterilized and at the same time its battery is charged with a prescribed voltage, such that there is no need for a user to spend additional time to sterilize the mobile phone. Further, the mobile phone is sterilized at predetermined time intervals and different wavelengths within a predetermined range are periodically generated to execute such a sterilization process, resulting in the prevention of surface discoloration of the mobile phone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile phone charger for charging a battery of a mobile phone comprising:
  a charging current generator selectively generating a charging current upon receiving a charging initiation signal; and
  a sterilizer being powered by the charging current, the sterilizer sterilizing the battery and the mobile phone upon a change of charging mode from one of a pre-charge mode, a constant current mode, and a constant voltage mode to an other at predetermined time intervals.

2. The mobile phone charger as set forth in claim 1, wherein the sterilizer executes a sterilization function for sterilizing the mobile phone and the battery while a charging function for charging the battery with the charging current is executed, and terminates the sterilization function when the charging function is terminated.

3. The mobile phone charger as set forth in claim 1, wherein the charging current generator outputs different charging currents according to the charging mode, and the sterilizer repeatedly executes and terminates the sterilization function according to the charging mode.

4. The mobile phone charger as set forth in claim 3, wherein the charging mode is in sequence of the pre-charge mode, the constant current mode, and the constant voltage mode.

5. The mobile phone charger as set forth in claim 4, wherein the sterilizer executes the sterilization function for a predetermined time whenever the charging mode changes to another mode.

6. The mobile phone charger as set forth in claim 2, wherein the sterilizer generates different wavelengths from among several wavelengths within a predetermined range during the sterilization function.

7. The mobile phone charger as set forth in claim 1, wherein the sterilizer is one of an infrared sterilizer and an ultraviolet sterilizer.

8. A method for sterilizing a mobile phone and a battery using a mobile phone charger, comprising the steps of:
  a) generating a charging current upon receiving an input current;
  b) determining whether a charging connector is mounted by at least one of the battery and the mobile phone, the charging connector transferring the charging current to the at least one of the battery and the mobile phone; and
  c) when the charging connector is mounted, sterilizing the at least one of the battery and the mobile phone at predetermined time intervals by a sterilizer being powered by the charging current, the sterilizer sterilizing the at least one of the battery and the mobile phone upon a change of charging mode from one of a pre-charge mode, a constant current mode, and a constant voltage mode to an other.

9. The method as set forth in claim 8, wherein step (c) includes the steps of:
  c1) checking a voltage value charged in the at least one of the battery and the mobile phone mounted to the charging connector;
  c2) comparing the checked voltage value with a predetermined voltage value;
  c3) if the checked voltage value is lower than the predetermined voltage value, transmitting the charging current to the at least one of the battery and the mobile phone mounted to the charging connector; and
  c4) charging the at least one of the battery and the mobile phone with the charging current, and sterilizing the at least one of the battery and the mobile phone.

10. The method as set forth in claim 9, wherein step (c2) includes the steps of:
  c2-1) if the checked voltage value is higher than the predetermined voltage value, terminating the charging current applied to the at least one of the battery and the mobile phone; and
  c2-2) if the charging current is terminated, terminating charging the at least one of the battery and the mobile phone and at the same time terminating sterilization of the at least one of the battery and the mobile phone.

11. The method as set forth in claim 8, wherein step (a) includes the steps of:
  a1) outputting different charging currents according to the charging mode; and
  a2) repeatedly executing and terminating the sterilization function of the sterilizer according to the charging mode.

12. The method as set forth in claim 11, wherein the charging mode is in sequence of the pre-charge mode, the constant current mode, and the constant voltage mode.

13. The method as set forth in claim 12, wherein step (c) includes the step of executing the sterilization function for a predetermined time whenever the charging mode is changed.

14. The method as set forth in claim 8, wherein step (c) includes the step of sterilizing the at least one of the battery and the mobile phone using one of an infrared sterilization process and an ultraviolet sterilization process.

15. A mobile phone charger for charging a battery of a mobile phone, comprising:
  a charging current generator for generating a charging current;
  a charging connector connected to the mobile phone receiving the charging current, the charging connector receiving charging status information from the mobile phone; and
  a sterilizer for generating a wavelength signal corresponding to the charging current after the mobile phone is mounted to the charging connector, the sterilizer being powered by the charging current and sterilizing the mobile phone mounted to the charging connector upon a change of charging mode from one of a pre-charge mode, a constant current mode, and a constant voltage mode to an other at predetermined time intervals.

16. The mobile phone charger as set forth in claim 15, wherein the sterilizer executes a sterilization function of the mobile phone if it is determined that the battery of the mobile phone is being charged with the charging current on the basis of the charging status information.

17. The mobile phone charger as set forth in claim 16, wherein the charging current generator provides the mobile phone with different charging currents according to the charging mode, and the sterilizer repeatedly executes and terminates the sterilization function according to the charging mode.

18. The mobile phone charger as set forth in claim 17, wherein the charging mode is in sequence of the pre-charge mode, the constant current mode, and the constant voltage mode.

19. The mobile phone charger as set forth in claim 18, wherein the sterilizer executes the sterilization function for a predetermined time whenever the charging mode is changed.

20. The mobile phone charger as set forth in claim 15, wherein the sterilizer generates different wavelengths from among wavelengths within a predetermined range upon receiving the charging current, and executing the sterilization function of the sterilizer.

21. The mobile phone charger as set forth in claim 15, wherein the sterilizer is one of an infrared sterilizer and an ultraviolet sterilizer.

22. A method for sterilizing a mobile phone using a mobile phone charger with a sterilization function for sterilizing the mobile phone and a battery of the mobile phone, comprising the steps of:
  a) determining if the mobile phone is mounted to the mobile phone charger, and if so, providing the mobile phone with a charging current;
  b) determining whether the mobile phone receives charging status information indicative of a charging function active/inactive state of the battery;
  c) if the mobile phone receives the charging status information, determining whether a voltage value contained in the charging status information remains at a logic high state or a logic low state; and
  d) if the voltage value remains at a logic high state, executing a sterilization function of the mobile phone, the sterilization function being executed by a sterilizer being powered by the charging current, the sterilizer sterilizing the mobile phone upon a change of charging mode from one of a pre-charge mode, a constant current mode, and a constant voltage mode to an other.

23. The method as set forth in claim 22, further comprising the step of:
  e) if the voltage value remains at a logic low state, terminating the sterilization function of the mobile phone.

24. The method as set forth in claim 22, wherein the sterilization function is repeatedly executed at predetermined time intervals.

25. The method as set forth in claim 22, wherein the sterilization function is executed by generating different wavelengths from among wavelengths within a predetermined range.

26. The method as set forth in claim 22, wherein the sterilization function uses one of an infrared sterilization process and an ultraviolet sterilization process to sterilize the mobile phone.

27. The method as set forth in claim 22, wherein:
step (a) includes the step of generating different charging currents according to the charging mode; and
step (d) includes the step of repeatedly executing and terminating the sterilization function according to the charging mode.

28. The method as set forth in claim 27, wherein the charging mode is in sequence of pre-charge mode, the constant current mode, and the constant voltage mode.

29. The method as set forth in claim 28, wherein step (d) includes the step of executing the sterilization function for a predetermined time whenever the charging mode is changed.

* * * * *